(No Model.)

T. B. ATTERBURY.
GLASS MOLD.

No. 453,875. Patented June 9, 1891.

WITNESSES.
Harry L. Gill
W. B. Corwin

INVENTOR.
Thomas B. Atterbury
by his attys
Bakewell & Kerr

UNITED STATES PATENT OFFICE.

THOMAS B. ATTERBURY, OF ALLEGHENY, PENNSYLVANIA.

GLASS-MOLD.

SPECIFICATION forming part of Letters Patent No. 453,875, dated June 9, 1891.

Application filed January 8, 1887. Serial No. 223,730. (No model.)

*To all whom it may concern:*

Be it known that I, THOMAS B. ATTERBURY, of Allegheny city, in the county of Allegheny and State of Pennsylvania, have invented a new and useful Improvement in Glass-Molds; and I do hereby declare the following to be a full, clear, and exact description thereof.

Bulbs for incandescent lamps are made of glass by blowing, usually in a mold. The sides of the bulb are very thin, and as it is exhausted of air and has to resist the external pressure of the atmosphere its stability is affected by engraving, cutting, or etching of the surface. Consequently it has been customary to make these bulbs without any engraving, lettering, or other cutting upon them.

The object of my invention is the production of an incandescent-lamp bulb with any desired lettering or marking to indicate its manufacture or ownership thereon, without affecting the strength or stability of the article.

To enable others skilled in the art to make and use my invention, I will now describe it by reference to the accompanying drawings, in which—

Figure 1:
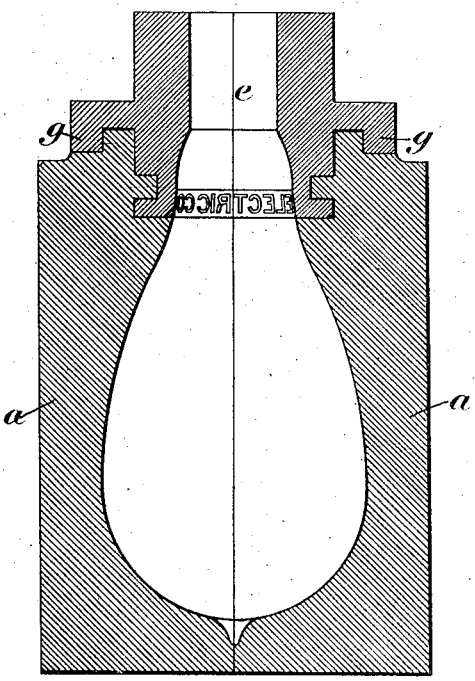
Figure 2:
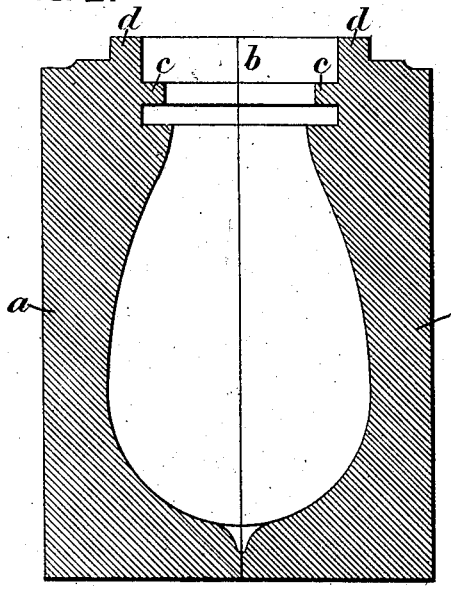
Figure 3:
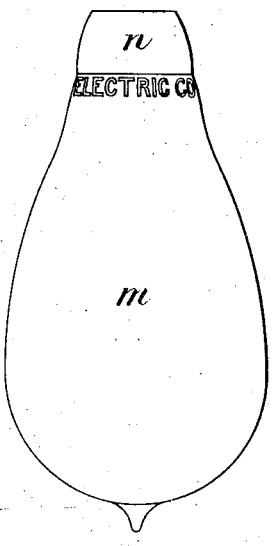

Figure 1 is a vertical section of the mold and ring. Fig. 2 is a like view with the neck-ring detached from the mold, and Fig. 3 is a view of the bulb.

Like letters of reference indicate like parts in each.

The mold $a$ is formed of two parts, which are united together by hinges or in any other known manner when in use. At the top it is cored out into a cylindrical shape, as shown at $b$, and in this cylindrical part $b$ is an annular ring or flange $c$, extending horizontally, and on the upper end is a vertical ring or flange $d$. Fitting into the cylindrical part $b$ is a two-part neck-ring $e$, provided with a flange $f$, which takes under the flange $c$, and an angular flange $g$, which extends over and encircles the vertical flange $d$. The molding cavity in which the bulb $m$ is formed extends up into the ring $e$ and terminates in a straight or cylindrical part, which forms the stem $n$ of the bulb. In or upon the said molding cavity of the ring $e$, I form the letters or patterns which I desire to communicate to the bulb $m$.

Thus constructed, the operation of my improvement is as follows: The mold being put together with the ring $e$, in place, the blower gathers a sufficient quantity of glass and inserts it into the mold in the usual way, and then blows it out into the form of a bulb. As soon as it comes in contact with the molding-surface of the ring $e$, he rotates the blow-pipe, and the glass, sticking against the surface of the ring $e$, causes it to rotate with the bulb. The continued blowing of the glass causes it to expand into or around the marks, letters, or patterns on the inner surface of the ring $e$, and thereby said figures, letters, or patterns are communicated to the surface of the bulb, as illustrated by Fig. 3. When the blowing is completed, the mold and ring are opened and the blower withdraws the bulb, so as to free the bulb, which can then be withdrawn from the lower end of the ring, after which it is submitted to the other operations necessary to its completion.

In the ordinary way of making these bulbs the glass is revolved inside of the mold to obliterate all mold-marks and to make a brilliant and finished surface. This revolution prevents the use of the mold to impart any pattern, name, or device to the surface of the bulb. By making the ring $e$ separate from the mold and capable of revolving with the glass, I am enabled to use it to impart the pattern, name, or device to the bulb free from other impressions or mold-marks. It is apparent that the situation of the ring or movable section $e$ of the mold may be changed without departing from my invention—that is to say, that instead of having the ring $e$ placed in the mouth of the stationary mold it may be placed in the sides of the molding-cavity at any desired point, so that when the revolving bulb of glass comes in contact with it it will be caught by and revolved with the bulb. It is also apparent that this invention may be applied to the manufacture of lamp-chimneys and other blown articles of glassware having a round cross-section by merely changing the shape of the mold to suit. The ring $e$ is made very light, so as to turn freely with the glass and enable the bulb to be made very thin. I can in this way produce any desired name, lettering, or device on the bulb without reducing its strength or affecting its durability, and without additional cost of manufacture.

What I claim as my invention, and desire to secure by Letters Patent, is—

A stationary mold for making blown incandescent-lamp bulbs and other hollow glass articles having a loose sectional ring provided with a name, character, or device, said ring being capable of revolving with the glass as it is turned or revolved in the mold, substantially as and for the purposes described.

In testimony whereof I have hereunto set my hand this 17th day of November, A. D. 1886.

THOMAS B. ATTERBURY.

Witnesses:
W. B. CORWIN,
THOMAS B. KERR.